(12) United States Patent
Yamauchi

(10) Patent No.: US 8,155,059 B2
(45) Date of Patent: Apr. 10, 2012

(54) WIRELESS COMMUNICATIONS CONNECTION CONTROL METHOD

(75) Inventor: Masaki Yamauchi, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 465 days.

(21) Appl. No.: 12/457,285

(22) Filed: Jun. 5, 2009

(65) Prior Publication Data

US 2009/0303931 A1 Dec. 10, 2009

(30) Foreign Application Priority Data

Jun. 6, 2008 (JP) ................... 2008-149285

(51) Int. Cl.
*H04L 12/28* (2006.01)
*H04L 12/56* (2006.01)
*H04J 3/06* (2006.01)
*H04B 7/212* (2006.01)

(52) U.S. Cl. ... 370/328; 370/335; 370/390; 370/395.43; 370/400; 709/249

(58) Field of Classification Search .......... 370/331–338, 370/347–350, 395.2, 395.43, 400–473, 503–516, 370/232–330; 375/356; 709/203–249; 714/748; 719/314
See application file for complete search history.

(56) References Cited

U.S. PATENT DOCUMENTS 7,280,483 B2 * 10/2007 Joshi ............................. 370/238
7,885,601 B2 * 2/2011 Kawakami et al. .......... 455/41.2
2004/0003111 A1 * 1/2004 Maeda et al. ................. 709/237
2006/0291415 A1 * 12/2006 Xu ................................ 370/331
2011/0128914 A1 * 6/2011 Furukawa et al. ............ 370/328

FOREIGN PATENT DOCUMENTS

| JP | 2001237764 A | 8/2001 |
| JP | 2006-050371 A | 2/2006 |
| JP | 2006-526937 A | 11/2006 |
| WO | WO-2007/122620 A2 | 11/2007 |

OTHER PUBLICATIONS

IEEE (Institute of Electrical and Electronics Engineers). Revision of IEEE Std 802.15.4-2003. "Part 15.4b: Wireless Medium Access Control (MAC) and Physical Layer (PHY) Specifications for Low Rate Wireless Personal Area Networks (WPANs)". 2006.
IEEE: "Part 15.5: Mesh Topology Capability in Wireless Personal Area Networks (WPANs)", IEEE Standard 802.15.5-2009, May 8, 2009, XP002575818.

(Continued)

*Primary Examiner* — Afsar M. Qureshi
(74) *Attorney, Agent, or Firm* — Rabin & Berdo, P.C.

(57) ABSTRACT

A wireless communications connection control method that enables flexible reconstruction of a wireless communications network system structure. The wireless communications connection control method comprising the steps of retaining in advance a node registration table in which the inter-node distance and node types are associated with each node; issuing a joining notification, together with the inter-node distance, in response to when a new node joins the wireless communications system; refreshing the node registration table according to the joining notification, determining whether it is necessary to change the node type based on the inter-node distance stored in the node registration table, and changing the node type stored in the node registration table when it is determined that the type needs to be refreshed.

5 Claims, 15 Drawing Sheets

OTHER PUBLICATIONS

W. Schott et al., "e-SENSE Protocol Stack Architecture for Wireless Sensor Networks" 16th 1st Mobile and Wireless Communications Summit, 2007 IEEE Piscataway, NJ, USA, Jul. 1, 2007, pp. 1-5, XP031132439.

A.B. Kulkarni et al., "Engineering Self-Critical Behavior in Mobile Adhoc Networks", Military Communications Conference, 2006. MILCOM 2006, IEEE, PI, Oct. 23, 2006, pp. 1-7, XP031331738.

* cited by examiner

| EXTENSION ADDRESS | NETWORK ADDRESS | NETWORK DISTANCE | JOINING PERMISSION |
|---|---|---|---|
| T01 | N00 | 0 | CAN JOIN |

| EXTENSION ADDRESS | NETWORK ADDRESS | NETWORK DISTANCE | LINK QUALITY | ATTRIBUTE | JOINING PERMISSION |
|---|---|---|---|---|---|
| T02 | N11 | 1 | 1 | PARENT NODE | CAN JOIN |
| T07 | N32 | 3 | 1 | CHILD NODE | CAN JOIN |
| T05 | N33 | 3 | 1 | CHILD NODE | CAN JOIN |

FIG. 18

| EXTENSION ADDRESS | NETWORK ADDRESS | NETWORK DISTANCE | LINK QUALITY | NODE TYPE | JOINING PERMISSION |
|---|---|---|---|---|---|
| T01 | N00 | 0 | 1 | PARENT NODE | CAN JOIN |

FIG. 19

| EXTENSION ADDRESS | NETWORK ADDRESS | NETWORK DISTANCE | JOINING PERMISSION |
|---|---|---|---|
| T09 | N12 | 1 | CAN JOIN |

FIG. 20

| EXTENSION ADDRESS | NETWORK ADDRESS | NETWORK DISTANCE | LINK QUALITY | NODE TYPE | JOINING PERMISSION |
|---|---|---|---|---|---|
| T02 | N11 | 1 | 1 | PARENT NODE | CAN JOIN |
| T07 | N32 | 3 | 1 | CHILD NODE | CAN JOIN |
| T05 | N33 | 3 | 1 | CHILD NODE | CAN JOIN |
| T09 | N12 | 1 | 1 | OTHER NODE | CAN JOIN |

FIG. 21

| EXTENSION ADDRESS | NETWORK ADDRESS | NETWORK DISTANCE | LINK QUALITY | NODE TYPE | JOINING PERMISSION |
|---|---|---|---|---|---|
| T04 | N22 | 2 | 1 | PARENT NODE | CAN JOIN |
| T08 | N41 | 4 | 1 | CHILD NODE | CAN JOIN |
| T09 | N12 | 1 | 1 | OTHER NODE | CAN JOIN |

FIG. 22

| EXTENSION ADDRESS | NETWORK ADDRESS | NETWORK DISTANCE | JOINING PERMISSION |
|---|---|---|---|
| T05 | N23 | 2 | CAN JOIN |

FIG. 23

| EXTENSION ADDRESS | NETWORK ADDRESS | NETWORK DISTANCE | LINK QUALITY | NODE TYPE | JOINING PERMISSION |
|---|---|---|---|---|---|
| T04 | N22 | 2 | 1 | OTHER NODE | CAN JOIN |
| T08 | N41 | 4 | 1 | OTHER NODE | CAN JOIN |
| T09 | N12 | 1 | 1 | PARENT NODE | CAN JOIN |

FIG. 24

| EXTENSION ADDRESS | NETWORK ADDRESS | NETWORK DISTANCE | LINK QUALITY | NODE TYPE | JOINING PERMISSION |
|---|---|---|---|---|---|
| T02 | N11 | 1 | 1 | PARENT NODE | CAN JOIN |
| T07 | N32 | 3 | 1 | CHILD NODE | CAN JOIN |
| T05 | N23 | 2 | 1 | OTHER NODE | CAN JOIN |
| T09 | N21 | 1 | 1 | OTHER NODE | CAN JOIN |

FIG. 25

| EXTENSION ADDRESS | NETWORK ADDRESS | NETWORK DISTANCE | LINK QUALITY | NODE TYPE | JOINING PERMISSION |
|---|---|---|---|---|---|
| T05 | N33 | 3 | 1 | PARENT NODE | CAN JOIN |

FIG. 26

| EXTENSION ADDRESS | NETWORK ADDRESS | NETWORK DISTANCE | LINK QUALITY | NODE TYPE | JOINING PERMISSION |
|---|---|---|---|---|---|
| T05 | N23 | 2 | 1 | OTHER NODE | CAN JOIN |

FIG. 27

| EXTENSION ADDRESS | NETWORK ADDRESS | NETWORK DISTANCE | LINK QUALITY | NODE TYPE | JOINING PERMISSION |
|---|---|---|---|---|---|
| T04 | N22 | 2 | 1 | OTHER NODE | CAN JOIN |
| T08 | N33 | 3 | 1 | CHILD NODE | CAN JOIN |
| T09 | N12 | 1 | 1 | PARENT NODE | CAN JOIN |

| EXTENSION ADDRESS | NETWORK ADDRESS | NETWORK DISTANCE | JOINING PERMISSION |
|---|---|---|---|
| T08 | N33 | 3 | CAN JOIN |

| EXTENSION ADDRESS | NETWORK ADDRESS | NETWORK DISTANCE | LINK QUALITY | NODE TYPE | JOINING PERMISSION |
|---|---|---|---|---|---|
| T05 | N23 | 2 | 1 | PARENT NODE | CAN JOIN |

WIRELESS COMMUNICATIONS CONNECTION CONTROL METHOD

BACKGROUND OF THE INVENTION

1. Field of the Invention

The present invention relates to a wireless communications connection control method for controlling wireless communications connections among a plurality of nodes included in a wireless communications system.

2. Description of the Related Art

Recently there has been demand for adapting wireless communications network systems to more diverse applications, and there has also been demand for making it easier to join and leave such systems as well as for building more flexible communications network structures within such systems. A sequence for allowing a wireless terminal (referred to below as "nodes") to join a network, as shown in FIG. 30, is disclosed in "IEEE 802.15.4," IEEE (Institute of Electrical and Electronics Engineers): Non-Patent Literature 1, for example. A child node MAC that seeks to join the network transmits a beacon request, receives a beacon from e.g. a receive-enabled parent node MAC, and transmits an association request to one parent node among the nodes that have sent a beacon. The parent node MAC returns an association response, and assigns the child node MAC a network address. By setting the network address that has been received, the child node MAC can join the communications network.

SUMMARY OF THE INVENTION

In the technique disclosed in the Non-Patent Literature 1, the wireless communications network structure lacks flexibility because the network must be built by sequentially powering and starting up from wireless terminals located upstream in the network hierarchy in order to optimize the wireless communications network structure. In addition, after the wireless communications network has been built and started up, it has not been possible to rebuild the wireless communications network into an optimal structure, despite the ability to allow new additional nodes to join the wireless communications network as needed. When rebuilding, it has been necessary to temporarily power off the wireless terminals located downstream in the network hierarchy and near the added wireless terminals, and to then again sequentially power and start up from the wireless terminals located upstream. Problems have accordingly been presented in that constraints are imposed when building a wireless communications network and that the wireless communications network system that has been built is poorly adaptable to structural modification. An optimal wireless communications network structure thus cannot be achieved, and the network may suffer from poor system performance and stability. In view of the drawbacks noted above, an object of the present invention is to provide a wireless communications connection control method enabling flexible reconstruction of system structures that have already been built, without constraints such as power-up timing when a wireless communications network system is built.

The wireless communications connection control method of the present invention is a wireless communications connection control method for controlling wireless communications connections between nodes in a wireless communications system including a plurality of nodes, wherein the nodes wirelessly communicate with each other based on node type, the method comprising the steps of having each of the nodes retain in advance a node registration table in which the inter-node distance and type of the node are associated with each node and retained; issuing a joining notification, together with the inter-node distance, in response to a new node joining the wireless communications system; refreshing the node registration table according to the joining notification; determining the necessity of changing the node type based on the inter-node distance stored in the node registration table; and changing the node type stored in the node registration table according to a determination that the type needs to be refreshed.

BRIEF DESCRIPTION OF THE DRAWINGS

FIG. 18 is a view showing the node registration table for a node T09;
FIG. 19 is a view showing the node information of the node T09;
FIG. 20 is a view showing the node registration table for a node T04;
FIG. 21 is a view showing the node registration table for a node T05;
FIG. 22 is a view showing the node information of the node T05;
FIG. 23 is a view showing the node registration table for a node T05;
FIG. 24 is a view showing the node registration table for a node T04;
FIG. 25 is a view showing the node registration table for a node T08;
FIG. 26 is a view showing the node registration table for a node T08;
FIG. 27 is a view showing the node registration table for a node T05.

DESCRIPTION OF THE PREFERRED EMBODIMENTS

Embodiments of the invention are described in detail below with reference to the accompanying drawings.

Figure 1:
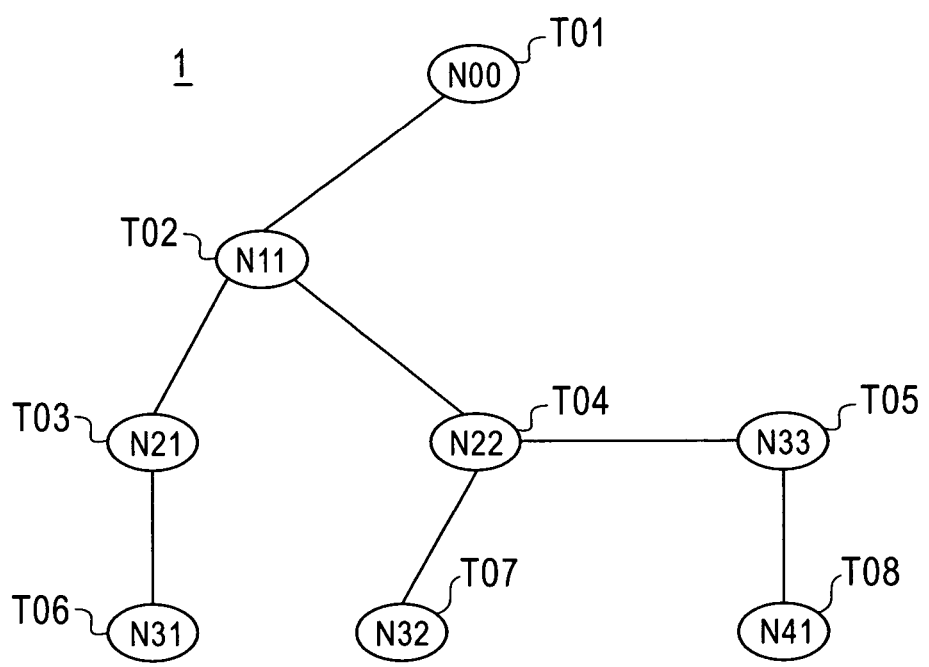
FIG. 1 is a view showing a wireless communications system in an embodiment.

FIG. 1 is a view showing a wireless communications system 1 according to the present embodiment. Eight wireless communications terminals (referred to below as "nodes") are included in the wireless communications system 1. Each of the nodes is assigned one extension address from among T01 through T08. The nodes are referred to below as nodes T01 through T08 corresponding to the assigned extension addresses. The nodes T01, T02, through T08 are assigned network addresses N00, N11, N21, N22, N31, N32, N33, and N41, respectively. The node T01 assigned the network address N00 is designated node T01:N00 below. The other nodes are also similarly designated node T02:N11, node T03:N21, node T04:N22, node T05:N33, node T06:N31, node T07:N32, and node T08:N41.

As shown in FIG. 1, the network topology of the wireless communications system 1 is a series structure in which the node T01:N00 is the root. The nodes connected to each other by solid lines are nodes that communicate with each other (referred to below as communications connection nodes). For example, nodes T01:N00, T03:N21, and T04:N22, which are connected by solid lines to the node T02:N11, are communications connection nodes for the node T02:N11. In the following description, the communications connection nodes on the side near the node T01:N00 (which is the root) side are referred to as parent nodes, and the nodes opposite that are farther away from the node T01:N00 are referred to as child nodes. Nodes that are neither parent nodes nor child nodes are referred to as other nodes. For example, the node T01:N00 is the parent node to the node T02:N11, and T03:N21 and T04:N22 are the child nodes. The rest are the other nodes for the node T02:N11. The network addresses can be calculated by Cskip as defined in IEEE802.15.4, for example, and it is possible to determine which nodes are the parent nodes, child nodes, and other nodes for each of the nodes based on the network addresses obtained by those calculations.

Figures 2, 3:
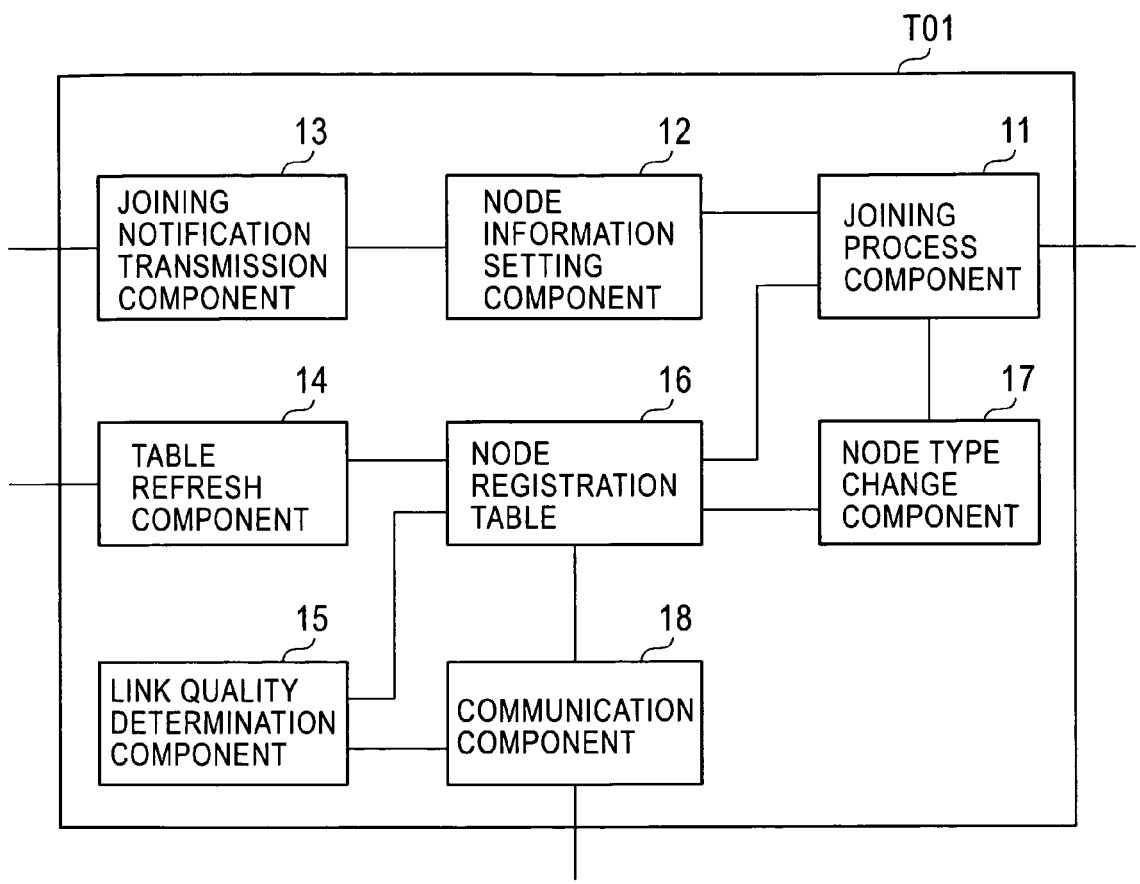
FIG. 2 is a block diagram showing nodes.
FIG. 3 is a view showing node information.

FIG. 2 is a block diagram showing the node T04. The node T04 includes a joining process component 11, a node information setting component 12, a joining notification transmission component 13, a table refresh component 14, a link quality determination component 15, a node registration table 16, a node type change component 17, and a communication component 18.

The joining process component 11 has joining request transmission means for issuing a joining request to nodes that are to become parent nodes when the node joins the wireless communications system 1 or in response to a determination by the table refresh component 14 that the settings for communications connection nodes should be refreshed. The joining request is, for example, a beacon request signal. The joining process component 11 also has joining permission notification means for issuing notification of joining permission using a beacon signal, for example, in response to a joining request from a node that is to become a child node.

After the joining request, the joining process component 11 issues a network address provision request to nodes that are to become parent nodes, by using an association request signal, for example. Using an association response signal, for example, the joining process component 11 issues to the relevant nodes the network addresses determined in response to the network address provision request from the nodes that are to become the child nodes. The joining process component 11 provides the network addresses from the parent nodes to the node information setting component 12.

The node information setting component 12 stores the information related to its own node (referred to below as "node information"). The node information includes an extension address, a network address, a network distance, and joining permission. FIG. 3 is a view showing the node information for the node T04:N22. The extension address is a node-specific identifier, which is T04 for the node T04:N22. The network address is an identifier on the network, and is the address provided from the parent node. The network address for the node T04:N22 is N22. The network distance is the distance between nodes on the network topology, from the node T01:N00 (the root) to the node itself. Here, the network distance is represented as the number of hops from the node T01:N00 to the node itself. Because the node T04:N22 is the 2nd hop from the node T01:N00, the network distance is 2. Because the node T01:N00 is itself the root, its network distance is 0. Joining permission represents whether the node itself can or cannot connect to child nodes according to the criteria of "can join" or "cannot join."

Figures 4, 5:
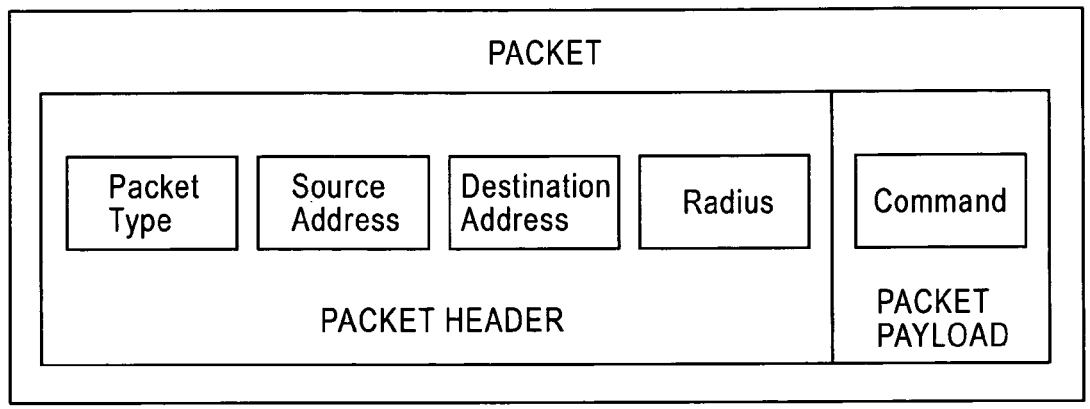
FIG. 4 is a view showing a joining notification packet.
FIG. 5 is a view showing a node registration table.

The joining notification transmission component 13 issues joining notification, along with the node information stored in the node information setting component 12, to nearby nodes when the wireless communications system 1 is newly joined or re-joined. The joining notification transmission component 13 issues joining notification by any transmission means among broadcasting to individual nodes in broadcast range, multicasting to individual nodes corresponding to the node information stored in the node registration table 16, or unicasting to one of the nodes corresponding to the node information stored in the node registration table 16. The joining notification transmission component 13 broadcasts the joining notification. FIG. 4 is a view showing a joining notification packet. The packet comprises a packet header and packet payload. The packet header includes the packet type, the network address of the node itself (source address), data indicating broadcast transmission (destination address), and broadcast radius (radius). The packet period command includes the extension address of the node itself, network distance, and joining permission.

The table refresh component 14 receives the joining notification and refreshes the node registration table 16 based on the node information contained in the joining notification. For example, when the extension address in the node information is T09, the table refresh component 14 searches the node registration table 16 to determine whether or not information related to the extension address T09 is registered there, and when no information is registered, registers the node information included in the joining notification in the node registration table 16. The table refresh component 14 also has node information deletion means for deleting the node information stored in the node registration table 16 after a predetermined period of time has passed since the point in time when the information was stored. Node information can be deleted after a predetermined period of time has passed so as to control the memory volume in the node registration table 16.

The link quality determination component 15 continuously monitors the wireless communication status of the transmission component 17 and determines the link quality for each node. The link quality is, for example, the wireless reception strength, correlation value, error rate, etc. The link quality is represented by a link quality value, such as 1: good; 2: fair; and 3; good. The link quality determination component 15 registers the resulting link quality value in the node registration table 16.

The node registration table 16 stores node information (extension address, network address, network distance, and joining permission), link quality, and node type (collectively referred to below as "registration information") for each node. FIG. 5 is a view showing the node registration table for the node T04:N22. The node registration table includes registration information corresponding to the node T02:N11 (the parent node) and the nodes T05:N33 and T07:N22 (child nodes). In the case of the node T02:N11, for example, the extension address is T02, the network address is N11, the network distance is 1, the link quality is 1, the node type is parent node, and the joining permission is "can join." Here, the node information, the link quality, and the node type are registered and refreshed by the table refresh component 14, link quality determination component 15, and node type change component 17, respectively.

The node type change component 17 selects the parent node based on the registration information stored in the node registration table 16, and determines whether or not the node type setting should be refreshed. The node type change component 17 determines, for each node, the parent node selection reference values obtained by means of the product of the network distance and the link quality, for example. When a node has a parent node selection reference value smaller than the parent node selection reference value of the current parent node, the node type change component 17 selects that node as the parent node and determines that the node type settings should be refreshed. The node with the lower parent node selection reference value is more suitable as the parent node. Even when "parent node" is not in the node type of the node registration table 16, the node type change component 17 will select a new parent node and will determine that the node type settings should be refreshed. The node type change component 17 may also determine parent node selection reference values based only on either just either the network distance or link quality.

For example, when the current parent node is a node with a network distance of 2 and a link quality of 1, the parent node selection reference value of the current parent node is 2×1=2. When the registration information of a new node with a network distance of 1 and a link quality of 1 is added here, for example, the parent node selection reference value of the new node will be 1×1=1. In this case, the parent node selection reference value 1 of the new node is lower than the parent node selection reference value of 2 of the current parent node, and the new node will accordingly be selected as the new parent node. When the parent node selection reference value of the parent node is 2 and the parent node selection reference value of a new node is 2 or more, the parent node will not be changed.

The node type change component 17 actually refreshes the node type settings when the joining process component 11 receives joining permission from the parent node.

The communication component 18 carries out wireless communication between nodes for which the node type in the node registration table 16 is a parent node or child node. Each of the nodes T01 through T08 have the same structure as described above.

Figure 6:
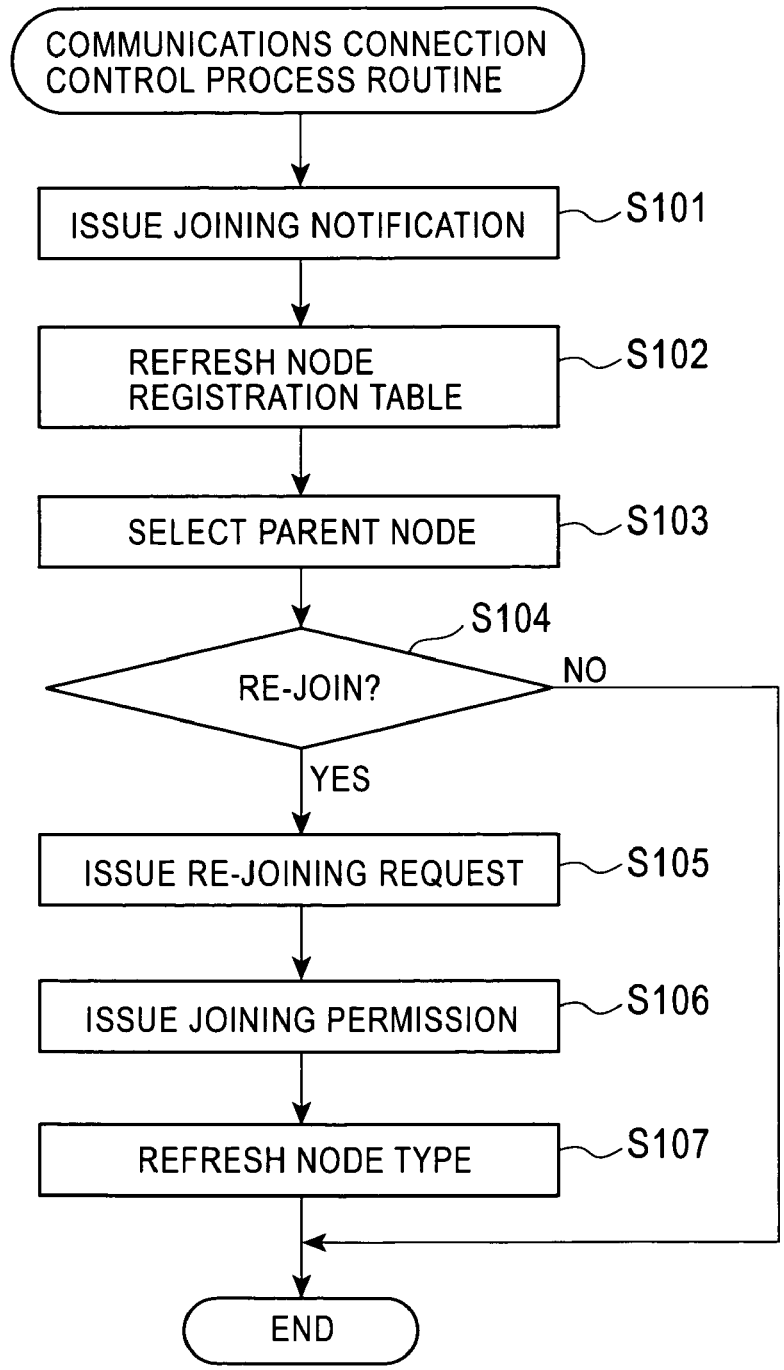
FIG. 6 is a flow chart showing a communications connection control routine in the wireless communications connection control method.
Figure 7:
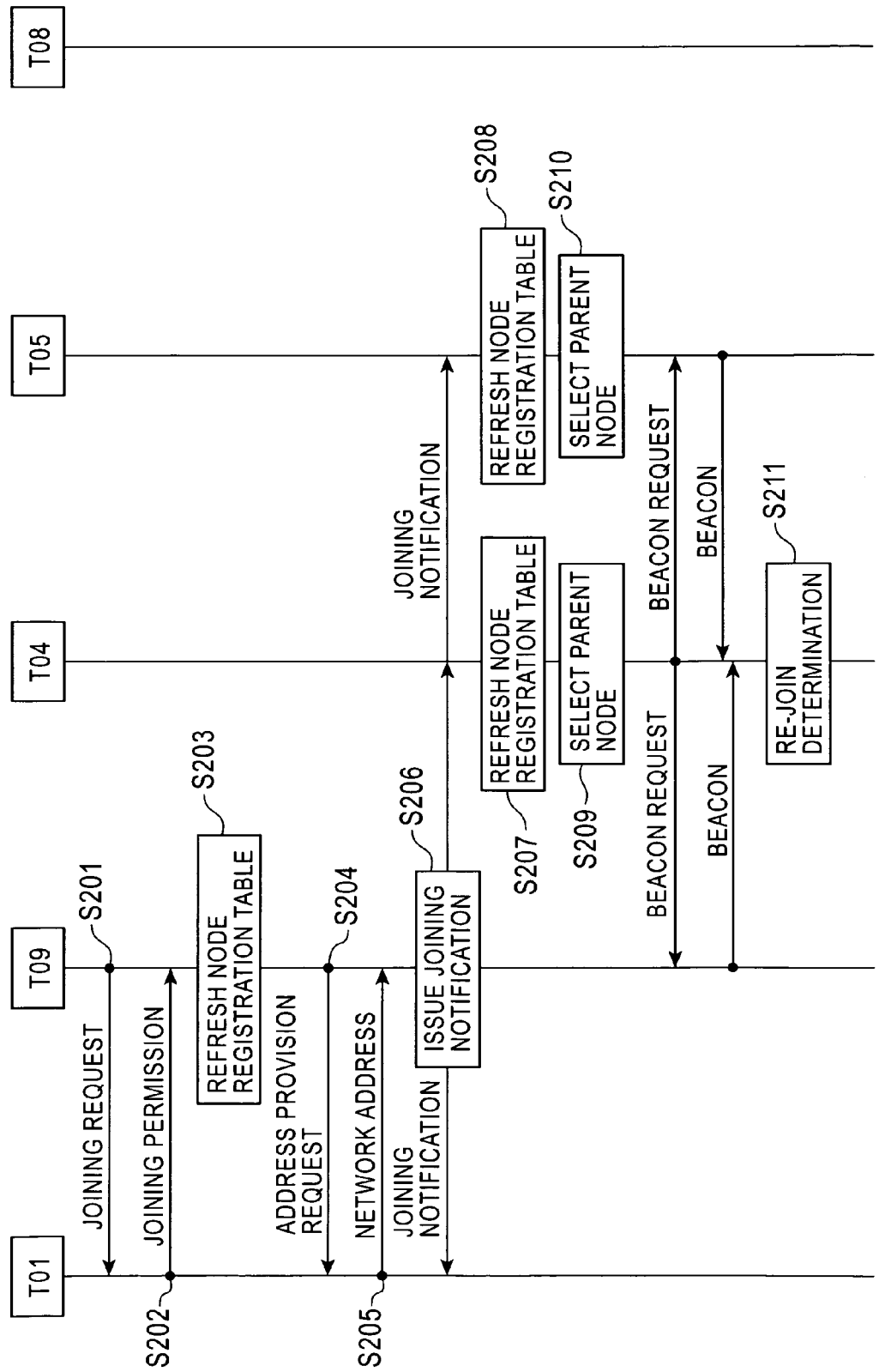
FIG. 7 is a first part of a sequence diagram showing the operations of a wireless connection control process.
Figure 8:
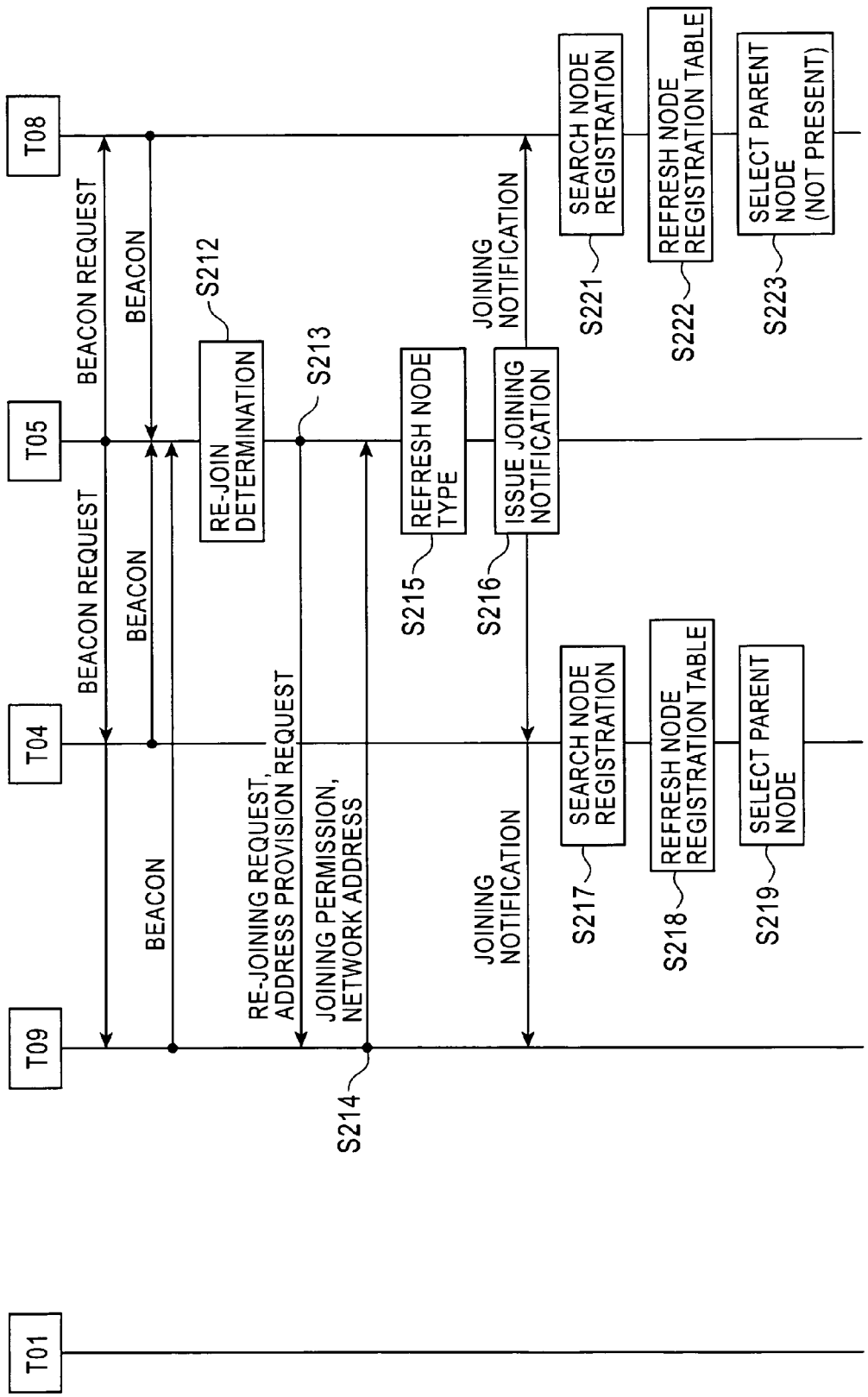
FIG. 8 is a second part of a sequence diagram showing the operations of a wireless connection control process.
Figure 9:
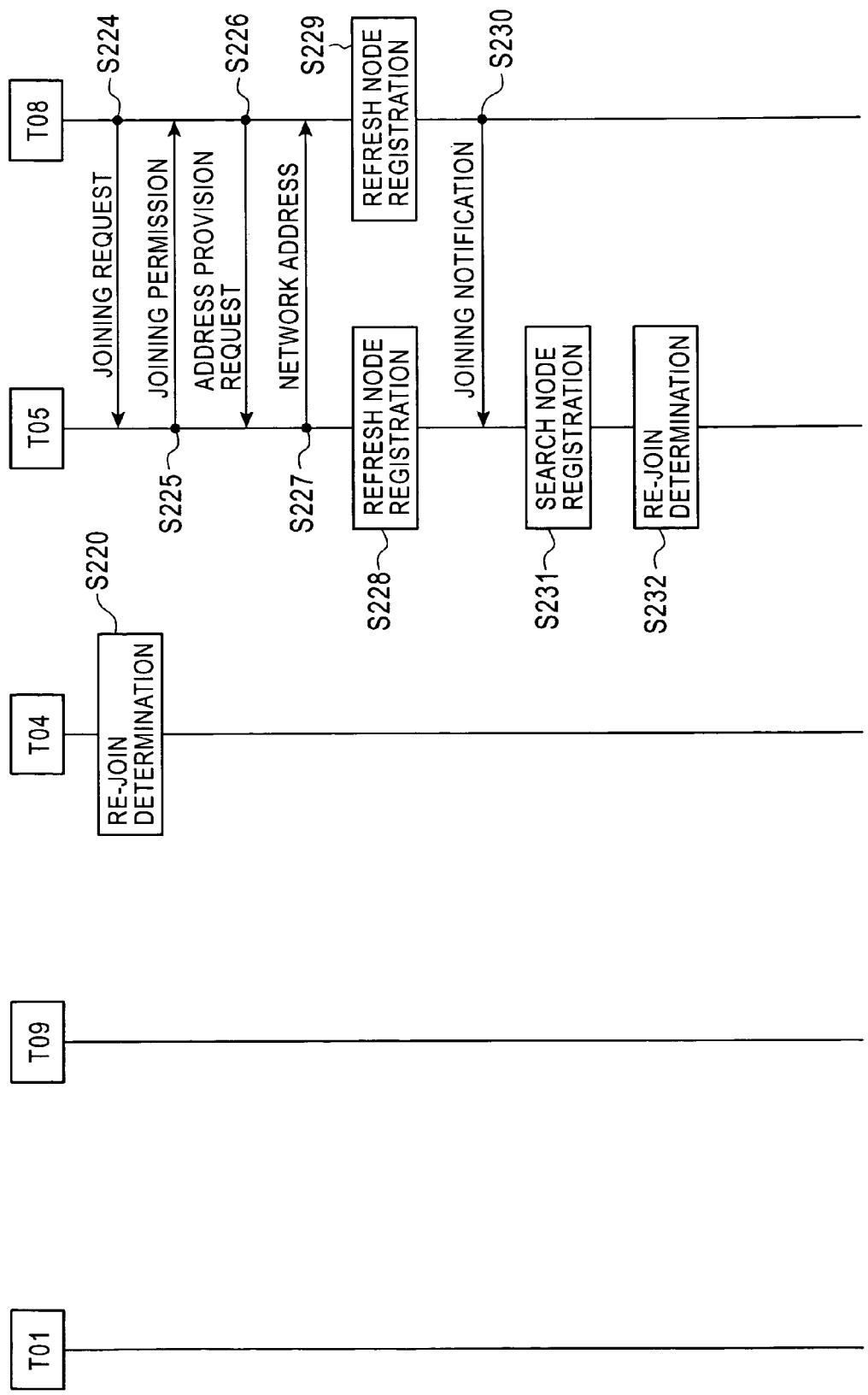
FIG. 9 is a third part of a sequence diagram showing the operations of a wireless connection control process.

FIG. 6 is a flow chart showing a communications connection control routine in the wireless communications connection control method. FIGS. 7, 8, and 9 are sequence diagrams showing the operations of the nodes T01, T09, T04, T05, and T08 when the node T09 newly joins the wireless communications system 1. The sequence in FIG. 8 is a continuation of the sequence in FIG. 7, and the sequence in FIG. 9 is a continuation of the sequence in FIG. 8. FIGS. 10 through 17 show the wireless communications system 1 along with notification signals and the like at this time. Appropriate reference will be made to FIGS. 6 through 17 in the following description of the communications connection control process using the wireless communications connection control method when the node T09 newly joins the wireless communications system 1.

Figure 10:
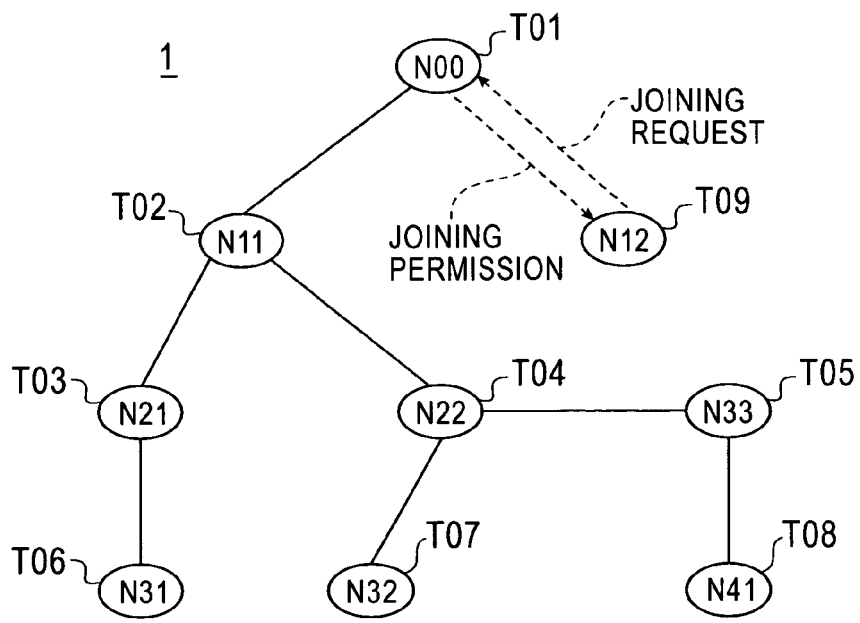
FIG. 10 is a view showing a wireless communications system along with a joining request and joining permission.
Figure 11:
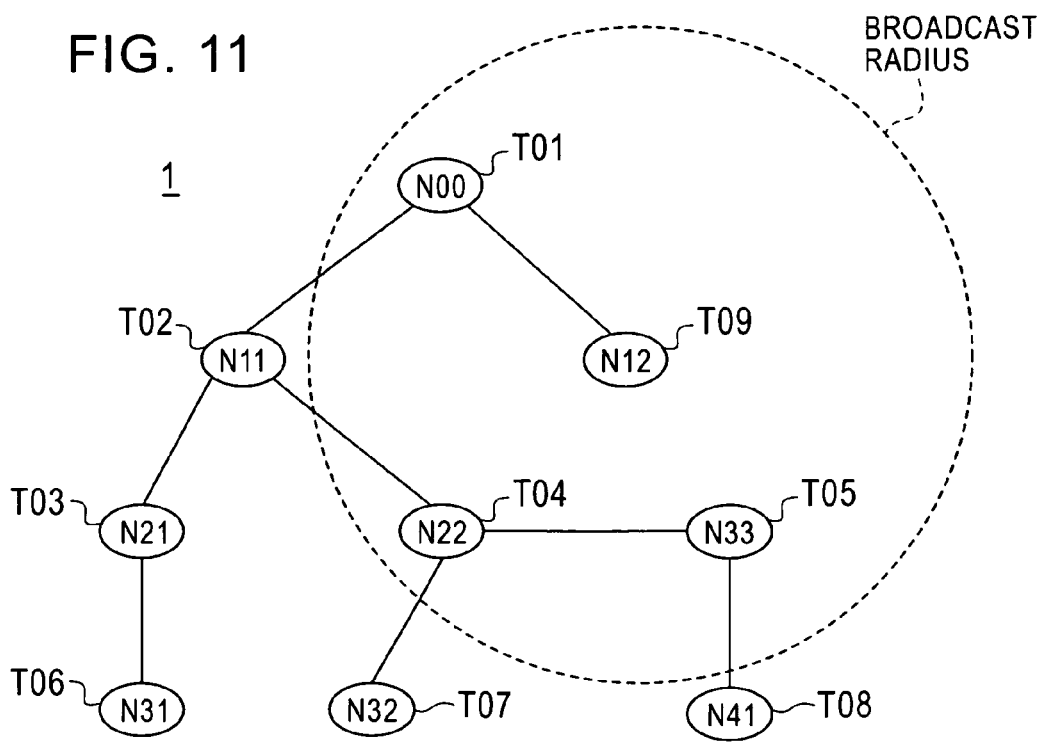
FIG. 11 is a view showing a wireless communications system along with a broadcast radius.

First, the node T09 issues a joining notification to T01 on joining the wireless communications system 1 (Step S201, FIG. 10). In response to the joining notification, the node T01:N00 gives joining permission along with its own extension, network address and the like to the node T09 (Step S202, FIG. 10). The node T09 registers the parent node T01:N00 in the node registration table (Step S203). FIG. 18 shows the post-registration node registration table for the node T09. The extension address, network address, network distance, link quality, node type, and joining permission are registered as T01, N00, 0, 1, "parent node," and "can join," respectively.

The node T09 then issues an address provision request to the node T01:N00 (Step S204). The node T01:N00 provides the network address N12 to the node T09 in response to the address provision request (Step S205). The node T09 refreshes its own node information to extension address T09, network address N12, a network distance of 1, and joining permission of "can join," as shown in FIG. 19. The node T09:N12 issues a joining notification, including its own extension address of T09, network address of N12, network distance of 1, and joining permission of "can join," to adjacent nodes within the broadcast radius indicated by the dashed line in FIG. 11; i.e., to the nodes T01:N00, T04:N22, and T05:N33 (step S101, Step S206, FIG. 11).

The nodes T04:N22 and T05:N33 that receive the joining notification search their own node registration tables to determine if there is any registration information corresponding to the extension address T09. Because the node T09:N12 has newly joined, no registration information corresponding to the extension address T09 is registered in the node registration tables of the nodes T04:N22 and T05:N33. The nodes T04:N22 and T05:N33 therefore register the node information for the node T09:N12 in their own node registration tables (Step S102, Step S207, and S208). FIG. 20 shows the node registration table for the node T04:N22. In addition to the previously registered registration information corresponding to extension addresses T02, T07, and T05, the registration information corresponding to the extension address T09 is added. The node type corresponding to the extension address T09 at this point in time is set as "other node" by the node type change component 17. The link quality of 1 in the node registration table is determined and registered by the link quality determination component 15. FIG. 21 shows the node registration table for the node T05:N33. In addition to the previously registered registration information corresponding to extension addresses T04, and T08, the registration information corresponding to the extension address T09 is added. The node type corresponding to the extension address T09 at this point in time is "other node."

The nodes T04:N22 and T05:N33 select parent node when their own node registration tables are refreshed (Step S103, Step S209, and S210). The node T04:N22 determines the parent node selection reference value by using the product of the network distance and link quality. The parent node selection reference value of the node T02:N11 (which is currently the parent node) is 1×1=1, and the parent node selection reference value of the added node T09:N12 is 1×1=1. Since the parent node selection reference value of both nodes is 1, the node T04:N22 determines that there is no need to refresh the node type settings (Step S104, Step S211), and the communications connection control process is complete. In the node T05:N33, the parent node selection reference value for the node T04:N22 is 2×1=2 and the parent node reference value for the node T09:N12 is 1×1=1. Because the parent node selection reference value of 1 for the node T09:N12 is lower than the parent node selection reference value of 2 for the node T04:N22, the node T04:N22 determines that the node type settings should be refreshed (Step S104, Step S212).

Figure 12:
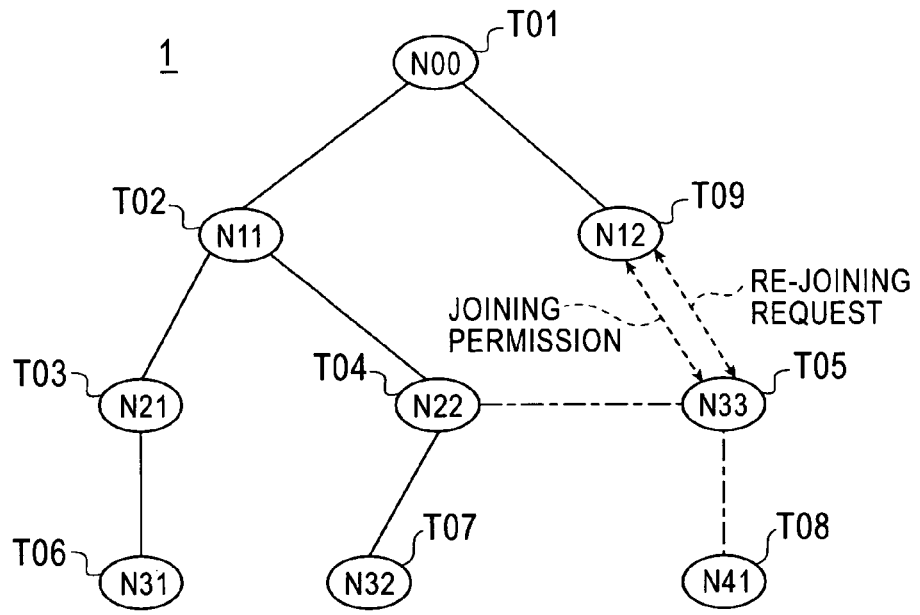
FIG. 12 is a view showing a wireless communications system along with a joining request and joining permission.
Figure 13:
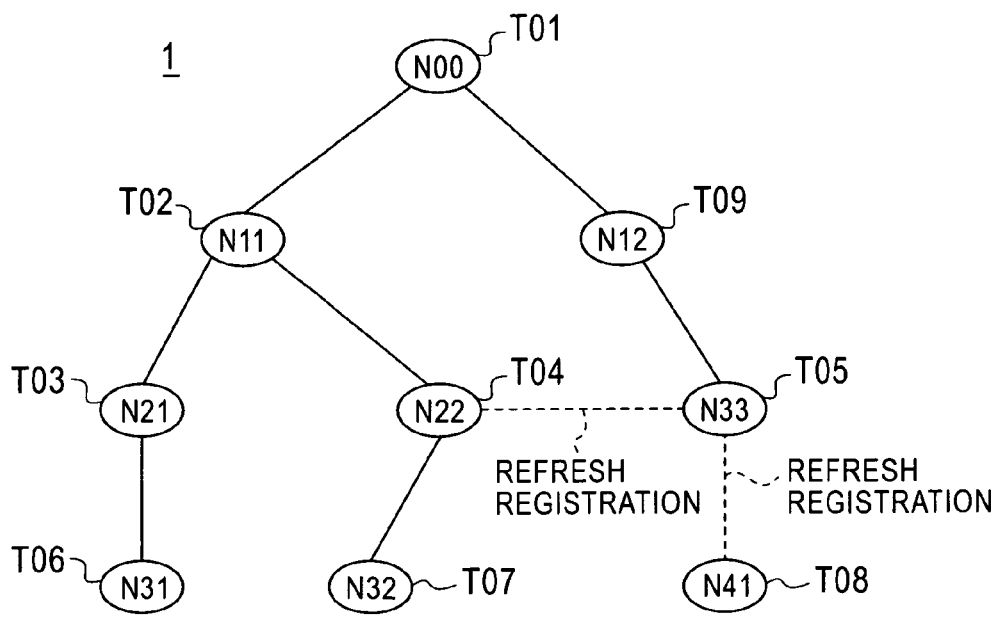
FIG. 13 is a view showing a wireless communications system along with registration refresh.

The node T05:N33 issues a re-joining request and network address provision request, as shown in FIG. 12, to the node T09:N12 that is to be established as the parent node (Step S105, Step S213). The node T09:N12 communicates joining permission to the node T05:N33 and issues the network address N23 (Step S106, Step S214), as shown in FIG. 12. The node T05:N33 refreshes its own node information, as shown in FIG. 22, to an extension address of T05, network address of N23, network distance of 2, and joining permission of "can join." The node T05:N23 refreshes the node type in its own node registration table (Step S107, Step S215). FIG. 23 shows the refreshed node registration table for the node T05:N23. The node types corresponding to the extension addresses T04 and T08 are changed to "other node," and the node type corresponding to the extension address T09 is changed to "parent node." The dashed line between the node T05:N23 and node T04:N22 in FIG. 13 and the dashed line between the node T05:N23 and node T08:N41 show that the node types in the registration table have been refreshed, so that the node T04:N22 and node T08:N41 become other nodes to the node T05:N23.

Figure 14:
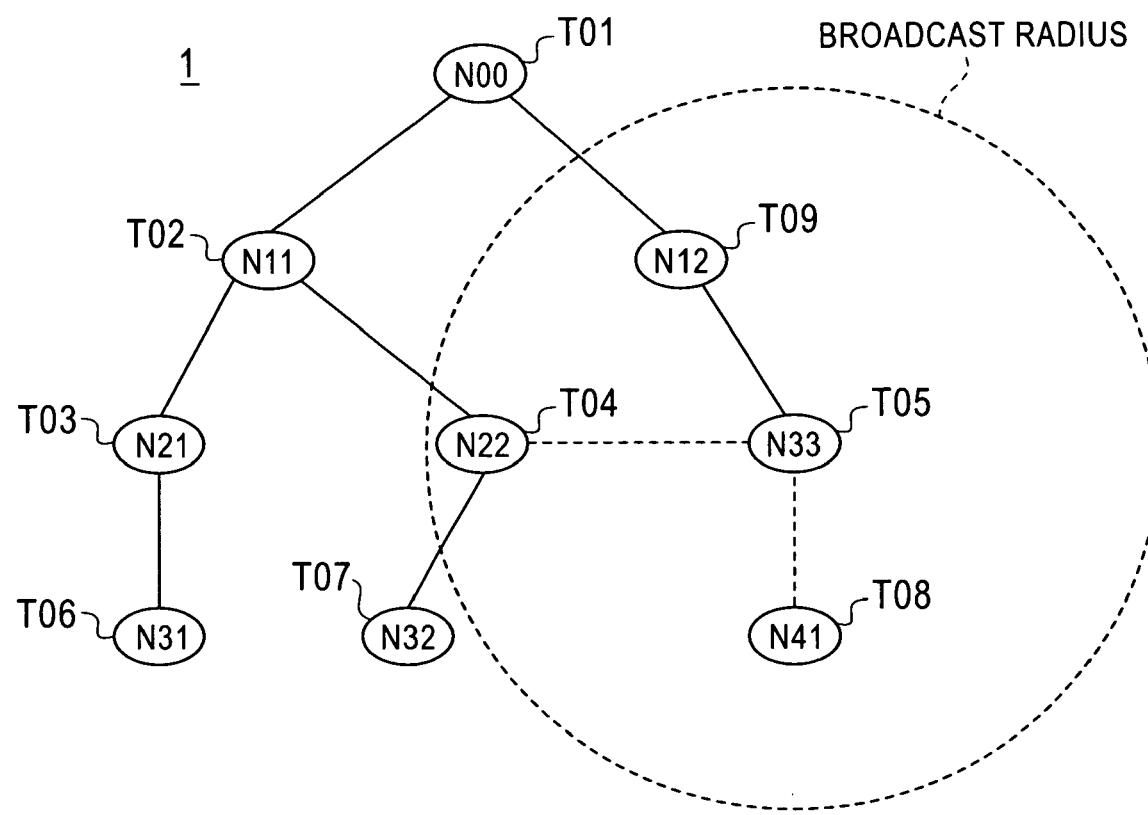
FIG. 14 is a view showing a wireless communications system along with a broadcast radius.

The node T05:N23 then issues a joining notification, including its own extension address T05, network address N23, network distance 2, and "can join" joining permission, to the adjacent nodes in the broadcast radius indicated by the dashed line in FIG. 14; i.e., to the nodes T04:N22, T08:N41, and T09:N12 (Step S101, Step S216, FIG. 14).

Figure 15:
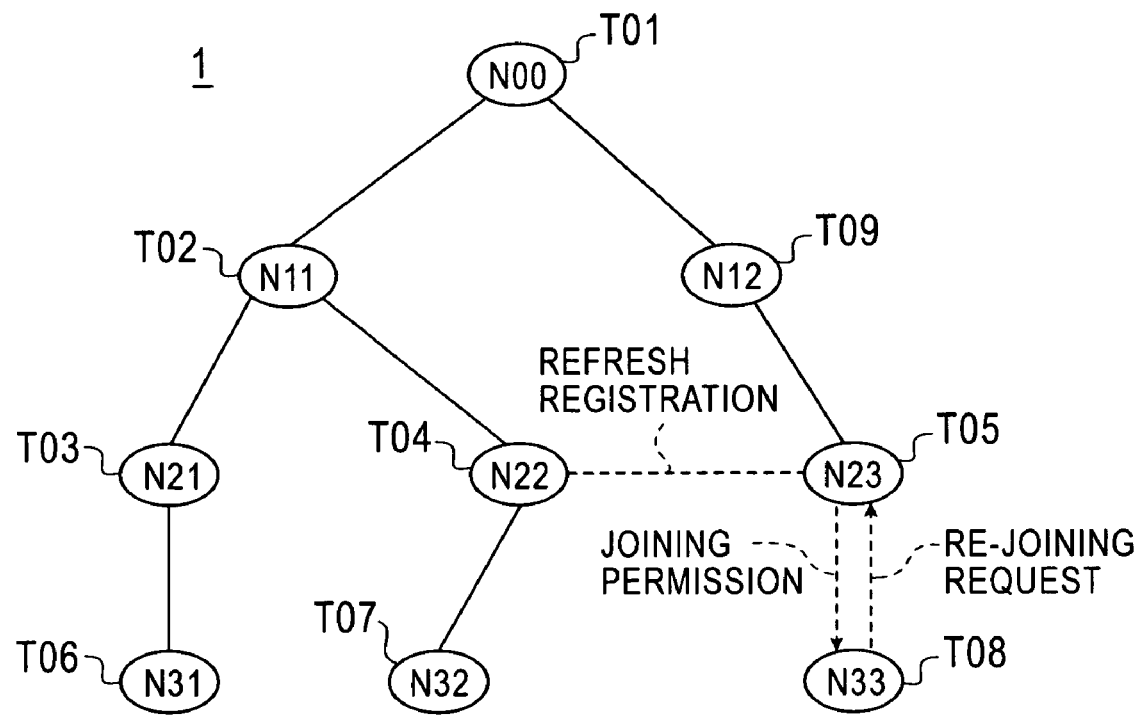
FIG. 15 is a view showing a wireless communications system along with a re-joining request, joining permission, and registration refresh.

The node T04:N22 that has received the joining notification searches its own node registration table to determine if there is any registration information corresponding to the extension address T09 (Step S217). The node T04:N22 refreshes the registration data corresponding to the previously registered extension address T09 (Step S218, FIG. 15). FIG. 24 shows the refreshed node registration table for the node T04:N22. The node registration table (before being refreshed) for the node T04:N22 is also shown in FIG. 20. Comparison of the node registration table before and after being refreshed reveals that the network address for the extension address T05 is changed from N33 to N23, the network distance is changed from 3 to 2, and the node type is changed from "child node" to "other node." The node type is also set by the node type change component 17. The dotted line between the node T04:N22 and node T05:N23 in FIG. 15 shows that the node types in the registration table have been refreshed, so that the node T05:N23 becomes the other node to the node T04:N22.

The node T04:N22 refreshes its own node registration table and selects the parent node (Step S103, Step S219). The parent node selection reference value of the node T02:N11 (which is currently the parent node) is 1×1=1, and the parent node selection reference value of the refreshed extension address T05 is 2×1=2. Since the parent node selection reference value 1 of the node T02:N11 (the current parent node) is lower than the parent node selection reference value 2 of the refreshed extension address T05, the node T04:N22 determines that there is no need to refresh the node type settings (Step S104, Step S220), and the communications connection control process is concluded.

The node T08:N41 that has received the joining notification searches its own node registration table to determine if there is any registration information corresponding to the extension address T09 (Step S221). The node T08:N41 refreshes the registration data corresponding to the previously registered extension address T09 (Step S222). FIG. 25 shows the node registration table, before being refreshed, corresponding to the node T08:N41. FIG. 26 shows the refreshed node registration table for the node T08:N41. Comparison of the node registration table before and after being refreshed reveals that the network address for the extension address T05 is changed from N33 to N23, the network distance is changed from 3 to 2, and the node type is changed from "parent node" to "other node."

The node T08:N41 refreshes its own node registration table and selects the parent node (Step S103, Step S223). As shown in FIG. 26, there is no "parent node" in the node types of the refreshed node registration table. The node T08:N41 therefore issues a re-joining request, as shown in FIG. 15, to the node T05:N23 which is to be established as the parent node (Step S105, Step S224). The node T05:N23 communicates the joining permission to the node T08:N41, as shown in FIG. 15, in response to the re-joining request (Step S106, Step S225). The node T08:N41 then issues a network address provision request to the node T05:N23 (Step S226), and the node T05:N23 gives the network address N33 to the node T08:N41 in response to the provision request (Step S227).

The node T05:N23 refreshes its own node registration table (Step S228). FIG. 27 shows the refreshed node registration table for the node T05:N23. The node registration table (before being refreshed) of the node T08:N33 is also shown in FIG. 23. Comparison of the node registration tables before and after being refreshed reveals that the network address for the extension address T08 is changed from N41 to N33, the network distance is changed from 4 to 3, and the node type is changed from "other node" to "child node."

Figures 28, 29, 30:
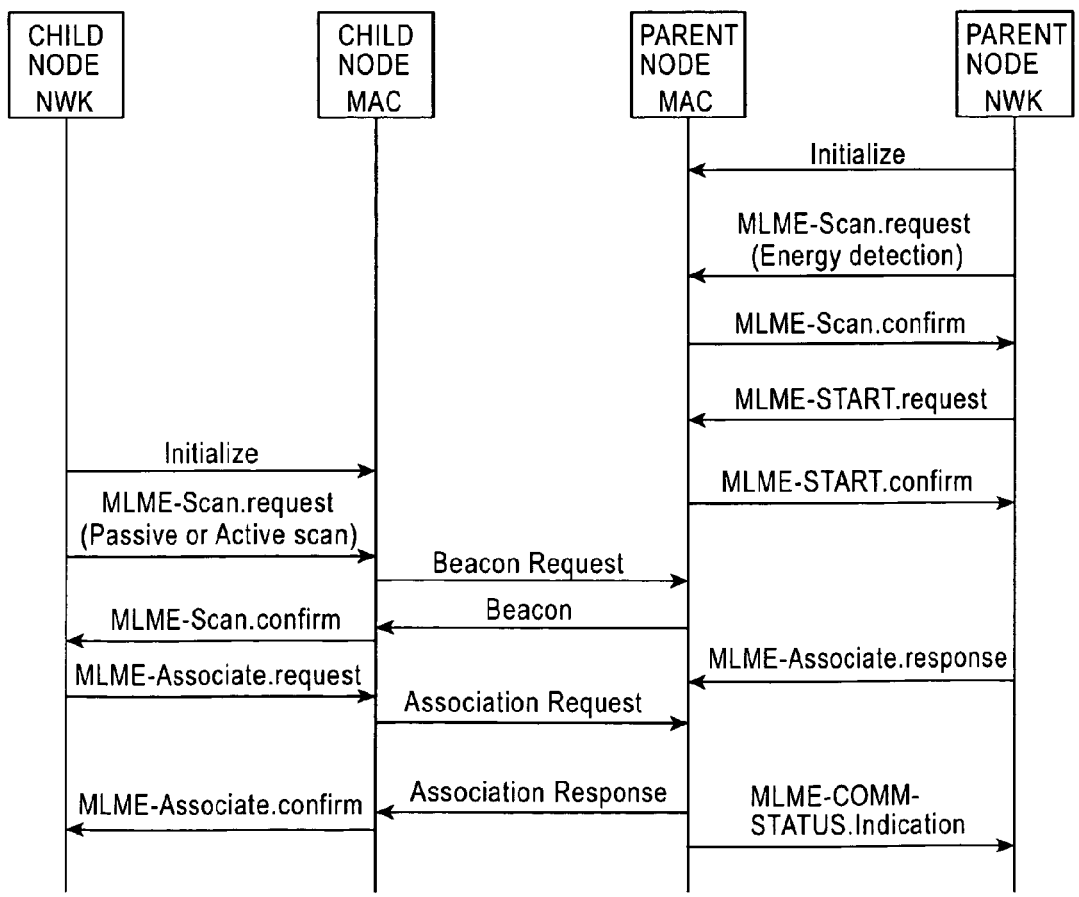
FIG. 28 is a view showing the node information of the node T08.
FIG. 29 is a view showing the node registration table for a node T08.
FIG. 30 is a sequence diagram showing the sequence by which a wireless terminal (node) joins a communications network in a conventional technique.

The node T08:N33 refreshes its own node information, as shown in FIG. 28, to an extension address of T08, a network address of N33, a network distance of 3, and joining permission of "can join." The node T05:N23 also refreshes the node type of its own node registration table (Step S107, Step S229). FIG. 29 shows the refreshed node registration table for the node T08:N33. The node registration table for the node T08:N33, before being refreshed, is also shown in FIG. 26. Comparison of the node registration table before and after being refreshed reveals that the node type corresponding to the extension address T05 is changed to "parent node."

Figure 16:
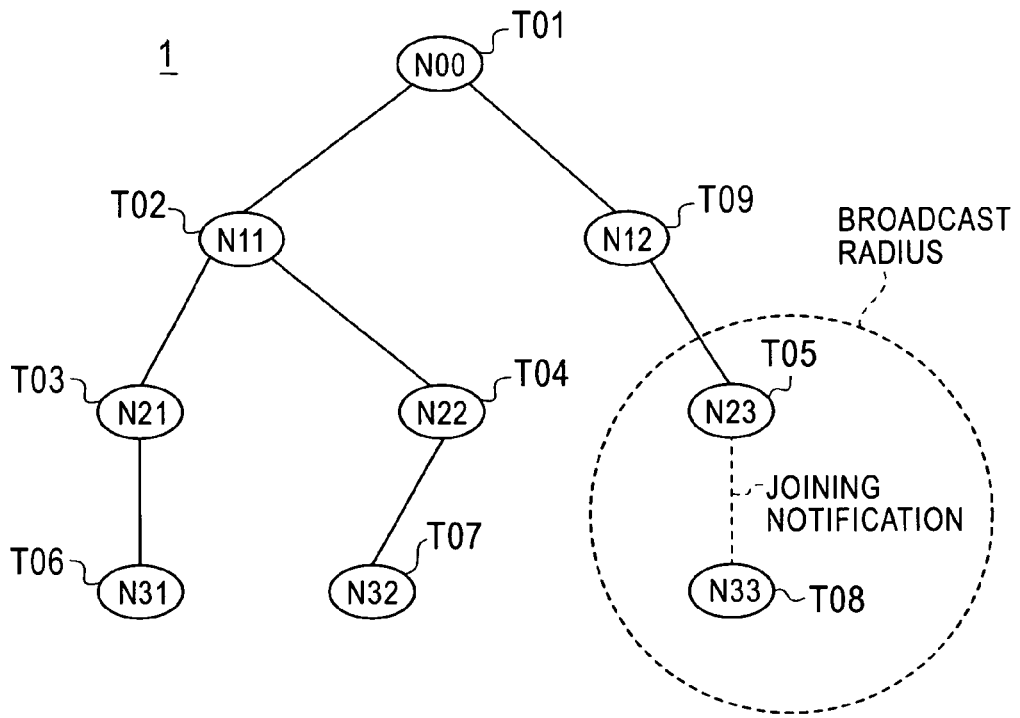
FIG. 16 is a view showing a wireless communications system along with a broadcast radius and joining notification.
Figure 17:
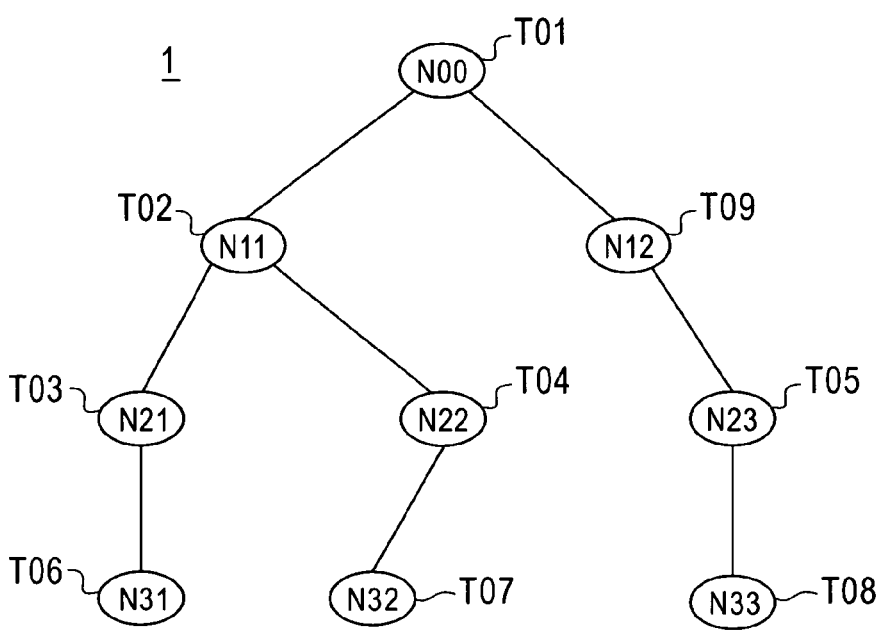
FIG. 17 is a view showing a wireless communications system after re-connection is complete.

The node T08:N33 then issues a joining notification, including its own extension address T08, network address N33, network distance 3, and "can join" joining permission, to the adjacent node in the broadcast radius indicated by the dashed line in FIG. 16; i.e., to the node T05:N23 (Step S101, S230, FIG. 16).

The node T05:N23 that has received the joining notification searches its own node registration table to determine if there is any registration information corresponding to the extension address T08 (Step S231). The node T04:N22 determines that it is not necessary to re-join because the registration information corresponding to the extension address T08 that has already been registered and the node information in the joining notification from the node T08:N33 are the same (Steps S102 to S104, S232).

FIG. 10 shows the wireless communications system 1 after re-connection is complete. Before the node T09 joined, the node T05 was located 3 hops from the node T01 (the root) through the nodes T02 and T04, but after the node T09 joined, the node T05 is 2 hops from the node T01 through the node T09. The number of hops from the node T05 to the node T01 (the root) can be deleted, allowing the wireless communications connection structure in the wireless communications system 1 to be optimized.

As noted above, in the wireless communications connection control method of this embodiment, a node that newly joins or rejoins a wireless communications system issues a joining notification with its own node information to adjacent nodes, and the adjacent nodes that receive the joining notification select a parent node and determine whether or not to rejoin based on the network distance, link quality, or the like. The adjacent node that is determined to be in need of joining then issues a joining request to the parent node, and refreshes the node type and sets a new parent node when a notification of joining permission and a network address are given in response to the joining request.

Such a process makes it possible to optimize wireless communications connection in the network topology of a wireless communications system through the autonomous deletion of the number of hops to the root node, without any need for the system administrator to manually process the joining and departing of the nodes, even when a node newly joins the wireless communications system. As a result, it is possible to eliminate conventional power-up timing constraints such as the need to sequentially power up from the root node to the subordinate nodes when building a wireless communications system, and wireless communications systems that have already been built up can be flexibly rebuilt.

This application is based on Japanese Patent Application No. 2008-149285 which is hereby incorporated by reference.

What is claimed is:

1. A wireless communications connection control method for controlling wireless communications connections between nodes in a wireless communications system including a plurality of said nodes, wherein said nodes wirelessly communicate with each other based on node type, said method comprising the steps of:
   having each of said nodes retain in advance a node registration table in which the inter-node distance and type of said node are associated with each node and retained;
   issuing a joining notification, together with the inter-node distance, in response to a new node joining said wireless communications system;
   refreshing said node registration table according to said joining notification;
   determining the necessity of changing said node type based on said inter-node distance stored in said node registration table; and
   changing the node type stored in said node registration table according to a determination that the type needs to be refreshed.

2. The wireless communications connection control method according to claim 1, further comprising the step of selecting parent nodes based on a parent node selection reference value calculated for each node based on said inter-node distance and/or the link quality between said nodes,
   wherein said node type is changed as said parent node in the step for changing said node type.

3. The wireless communications connection control method according to claim 2, further comprising the steps of:
   issuing a re-join request to said parent nodes; and
   issuing joining permission to nodes issued said re-join request from said parent nodes according to said re-join request,
   wherein said node type is changed in said step for changing the node type after said permission to join has been made.

4. The wireless communications connection control method according to claim 1, wherein, in the step for issuing said joining notification, said joining notification is issued by transmission means among means for broadcasting to individual nodes in a broadcast range, means for multicasting to individual nodes stored in said node registration table, or means for unicasting to one of the nodes stored in said node registration table.

5. The wireless communications connection control method according to claim 1, wherein said step for refreshing said node registration comprising a step of deleting, during the step for refreshing the table, said inter-node distance and said node type stored in the node registration table after a predetermined period of time has passed from the point in time when the information was stored.

* * * * *